United States Patent [19]
Smith

[11] 3,827,544
[45] Aug. 6, 1974

[54] STRIP CHART RECORDING ROLL AND SYSTEM FOR SUPPORTING ROLL DURING RECORDING

[75] Inventor: John R. Smith, Winchester, Mass.
[73] Assignee: Parke, Davis & Company, Detroit, Mich.
[22] Filed: Aug. 16, 1972
[21] Appl. No.: 281,073

[52] U.S. Cl. ............................................ 197/133 R
[51] Int. Cl. ............................................. B41j 15/00
[58] Field of Search ............................... 197/133 R

[56] References Cited
UNITED STATES PATENTS

| | | | |
|---|---|---|---|
| 545,169 | 8/1895 | More | 197/133 R |
| 631,402 | 8/1899 | Lewis | 197/133 UX |
| 1,619,530 | 3/1927 | Myers | 197/133 R |
| 1,808,857 | 6/1931 | Monsees | 197/133 R |
| 1,847,526 | 3/1932 | Going | 197/133 R |

Primary Examiner—Ernest T. Wright, Jr.
Attorney, Agent, or Firm—James F. Powers, Jr.; Albert H. Graddis

[57] ABSTRACT

The specific embodiment provides a system for supporting a strip chart recording roll where the recording roll includes an elongated core having strip chart recording material rolled thereabout. The core has at least one cylindrical end protruding from the rolled material, and the protruding end has an annular recess formed thereabout. The specific embodiment also provides a yoke having an upwardly opened substantially U-shaped portion for seating the annular recess therein.

3 Claims, 2 Drawing Figures

PATENTED AUG 6 1974

3,827,544

STRIP CHART RECORDING ROLL AND SYSTEM FOR SUPPORTING ROLL DURING RECORDING

BACKGROUND OF THE INVENTION

The present invention relates to a strip chart recording roll, and a system for supporting the strip chart recording roll during recording.

During a strip chart recording operation such as an electrocardiograph recording, it is important that the strip chart paper and/or paper roll does not transversely move or weave. Transverse movement of the paper and/or roll acts to move the reference base lines and thus presents a condition under which the recording can be misinterpreted.

It is known to provide an electrocardiograph paper roll spindle having flanges at the outer ends thereof. One of the prior art flanges is frictionally moveable with respect to the spindle to position and hold the recording roll on the spindle. However, the width of a roll of recording paper changes with humidity. Specifically, when the humidity rises the paper tends to expand to thus present a condition under which the paper might bind between the prior art flanges. Conversely, with a decrease in humidity the recording paper roll tends to dry out and thus shorten the width of the roll. Under the latter condition a paper roll would tend to weave between the flanges.

SUMMARY OF THE INVENTION

In accordance with the present invention, there is provided a system for supporting a strip chart recording roll wherein the strip chart recording roll includes an elongated core having strip chart recording material rolled thereabout. The core has at least one cylindrical end protruding from an end of the rolled material. The protruding cylindrical end comprises an annular recess formed about the periphery thereof. The system further comprises means for supporting the roll including a yoke having upwardly opened substantially U-shaped portion for seating the recess therein.

In accordance with another aspect of the present invention, there is provided a strip chart recording roll comprising a hollow cylindrical core, and a strip chart recording material rolled about the core. The core has at least one end thereof protruding from the rolled material, and the protruding end has an annular recess formed about the periphery thereof for seating in an upwardly opened substantially U-shaped support yoke.

The foregoing aspects of the invention do not require moving parts to mount the strip chart roll in the recording instrument. Further, the aspects of the invention eliminate the need for the prior art spindle flanges to thus avoid paper weave or paper binding during changes in humidity. Expansion or contraction in the width of the recording roll will occur only with respect to the elongated core. However, the elongated core of the present invention can not transversely move since the annular recess is seated in the support yoke.

DESCRIPTION OF A SPECIFIC EMBODIMENT

Figure 1:
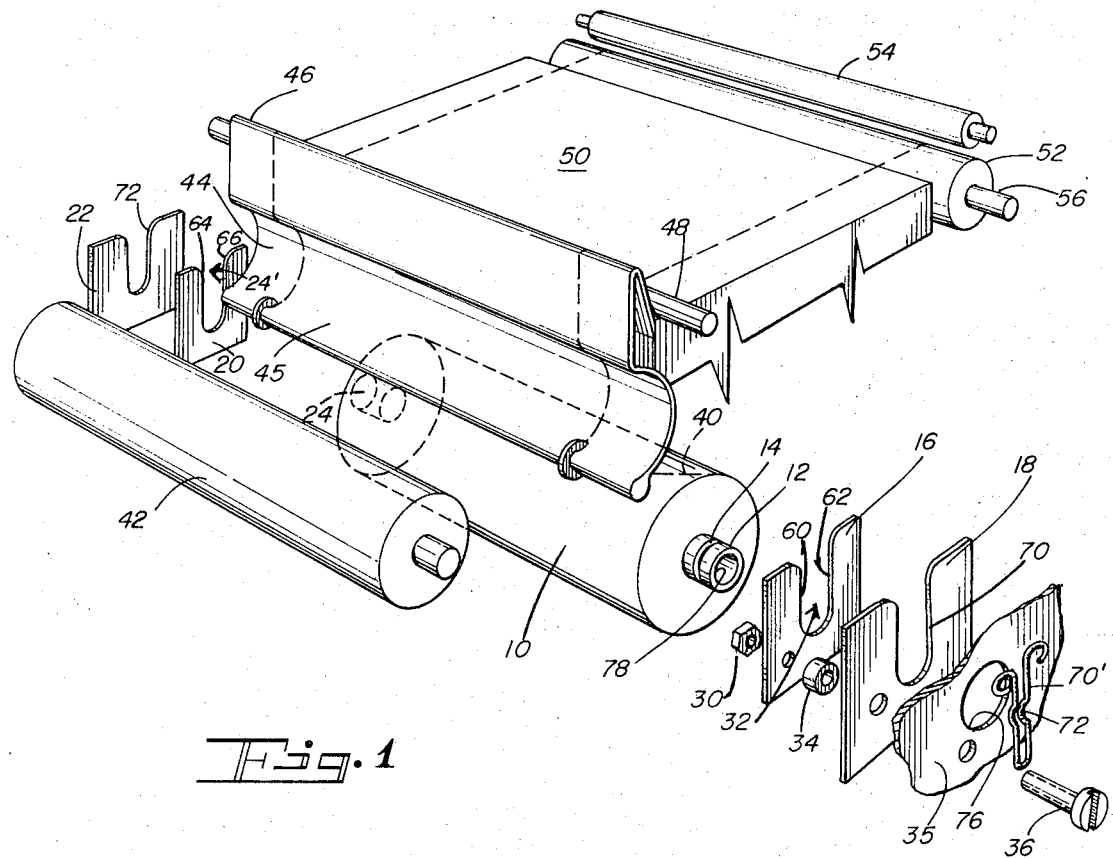
FIG. 1 is a perspective view of an electrocardiograph system for supporting a strip chart recording roll as an embodiment of the present invention.

With reference to FIG. 1, a strip chart recording roll 10 having a cylindrical core 12 is supported by spaced yokes 16, 20 such that an annular recess 14 on one protruding end of the core 12 is seated in an upwardly opened substantially U-shaped portion 32 of the yoke 16. The other protruding end 24 of the core 12 is positioned in an upwardly opened substantially U-shaped portion 24' of the other yoke 20.

Each one of the yokes 16, 20 is secured in spaced relationship with a guide plate 18, 22 by bolts 36 extending through side walls 35, spacer 34 the guide plate 18, 22, the yoke 16, 20, and to nuts 30. When thus secured to the side walls 35, the yokes 16, 20 are maintained in a rigid position.

The rolled material 40 extends from the roll 10 between a break roller 42 and a platen support 44. The break roller 42 is positioned closely to an arcuate surface 45 of the support 44 such that the recording material 40 moves in an arcuate path and upwardly over a platen 46 and down the other side of the platen 46 under a fixed guide rod 48. From the guide rod 48, the recording material 40 passes over a table 50 and between a drive roller 52 and a positioning roller 54. The drive roller 52 is driven by a motor (not shown) operatively connected to a drive shaft 56 to pull the recording material 40 from the roll 10 through the components 42, 44, 46, 48, 50, 52, 54 described hereinabove.

The generally vertical surfaces 60, 62; 64, 66 of the opened yoke portions 32, 24' are spaced apart a distance less than the respective guide plates 18, 22. Thus, when the roll 10 is positioned in the yokes 16, 20 the core 12 is not in contact with upwardly opened U-shaped portions 70, 72 of the guide plates 18, 22.

However, the space between the vertical surfaces 60, 62 of the yoke 16 is narrower than the spacing between the vertical surfaces 64, 66 of the yoke 20 to provide a seat for the annular recess 14 on the core 12. Thus, when the core 12 is positioned in the yoke 16 to seat the annular recess 14 in upwardly opened portion 32 the core 12 is restrained from transverse movement during a recording operation.

Generally, the weight of the roll 10 will normally keep the core 12 properly positioned in the yokes 16, 20. However, when the recording material 40 begins to run out, the core 12 will tend to move upwardly in the yokes 16, 20. A spring 70' having inwardly directed detents 72 is secured to the side wall 35 with the detents 72 extending through an aperture 76 into a hollow center 78 of the core 12. The detents 72 will prevent the core 12 from riding upwardly in the yokes 16, 20, when the rolled material 40 is beginning to run out.

A suitable diameter for the annular recess 14 is 0.715 inch and a suitable outer diameter for the core 12 is 0.76 inch. The spacing between the surfaces 60, 62 of the yoke 16 can suitably be 0.710 inch to provide a frictional setting of the annular recess 14 in the upwardly opened U-shaped portion 32 of the yoke 16. The spacing between the generally vertical surfaces of the U-shaped opening 24' of the other yoke 20 can be 0.780 to accomodate the outer diameter of the core 12. Further the guide plates 18, 22 have a greater height that the yokes 16,20 to guide the core 12 into the yokes 16,20.

It is contemplated that the spring 70' can alternatively be mounted such that the detents 72 are positioned within the hollow center 78 at the other side of the core 12. Further, two springs (only one spring 70' shown) can be provided to position detents 72 in the hollow center 78 on each end of the core 12.

Figure 2:
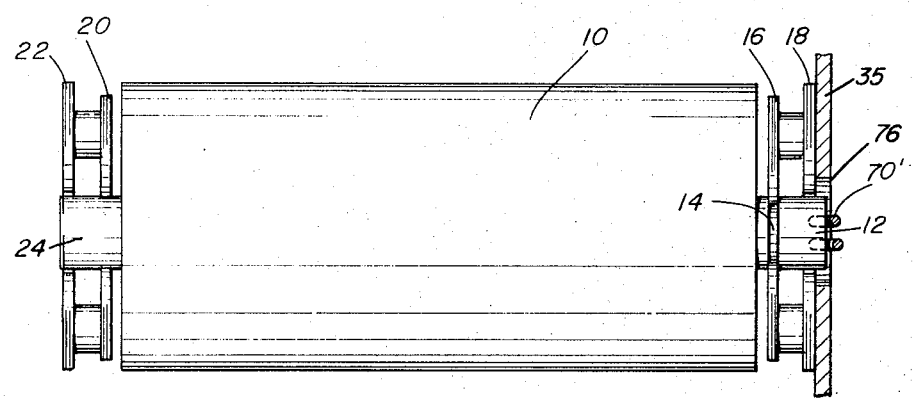
FIG. 2 is a top plan view of the portion of FIG. 1 showing means for supporting the strip chart recording roll.

As shown in FIG. 2, the right end of the core 12 extends a slight distance into the aperture 76. However, the ends of the core 12 can suitably terminate prior to or in the guide plates 18, 22. Further, the guide plates 18,22 can be positioned in abutting engagement with the yokes 16,20 with the spacers 34 positioned between the guide plates 18,22 and the supporting side walls 35 (only one shown).

What is claimed is:

1. In a system for supporting a strip chart recording roll, the combination comprising:

a strip chart recording roll including an elongated cylindrical core having strip chart recording material rolled thereabout;

said core having a first cylindrical end portion protruding from one end of the rolled material, and a second cylindrical end portion protruding from the other end of the rolled material;

said first protruding cylindrical end portion comprising an annular recess formed about the periphery thereof;

means for supporting said roll comprising first and second spaced support yokes, and first support yoke having an upwardly opened substantially U-shaped portion for seating said recess therein, and said second support yoke having an upwardly opened substantially U-shaped portion for seating a peripheral surface of said second protruding cylindrical end portion therein;

means for guiding said core into said first and second support yokes comprising first and second spaced guide plates;

said first guide plate including an upwardly opened slot for guiding said first protruding cylindrical end portion into said first support yoke;

said second guide plate including an upwardly opened slot for guiding said second protruding cylindrical end portion into said second support yoke;

at least one of said first and second protruding end portions being hollow; and releasable stop means extending into said hollow end portion for maintaining said recess and said second protruding cylindrical end portion in said first support yoke and said second support yoke respectively.

2. The system of claim 1 wherein said stop means comprises a biased detent extending into said hollow end portion.

3. The system of claim 1, wherein said recess is frictionally seated in the U-shaped portion of said first support yoke.

* * * * *